(12) United States Patent
Blair et al.

(10) Patent No.: US 7,640,851 B2
(45) Date of Patent: Jan. 5, 2010

(54) APPARATUS FOR STORING SEPARATING AND FILTERING COFFEE FILTERS

(76) Inventors: Joseph Allen Blair, P.O. Box 716, Robertsdale, AL (US) 36567; Larry Moore Moore, 14000 C. Annie Copper Ln., Summerdale, AL (US) 36580

( * ) Notice: Subject to any disclaimer, the term of this patent is extended or adjusted under 35 U.S.C. 154(b) by 94 days.

(21) Appl. No.: 11/286,588

(22) Filed: Nov. 23, 2005

(65) Prior Publication Data

US 2007/0113743 A1 May 24, 2007

(51) Int. Cl.
*A47J 43/14* (2006.01)
*B65H 3/02* (2006.01)

(52) U.S. Cl. .................. 99/504; 99/283; 99/289 R; 99/302 R; 221/259; 221/260; 221/36; 221/37; 221/210; 221/255; 221/283; 221/40; 221/45; 221/213; 141/358; 141/165; 141/173; 222/368

(58) Field of Classification Search .................. 141/358, 141/165, 173; 99/283, 289 R, 504, 287, 99/302 R; 221/259–60, 36–37, 210, 255, 221/283, 40, 45, 213; 222/368
See application file for complete search history.

(56) References Cited

U.S. PATENT DOCUMENTS 3,413,907 A * 12/1968 Schwertfeger et al. ........ 99/287
5,799,713 A * 9/1998 Moore ........................ 141/358

* cited by examiner

*Primary Examiner*—Shawntina Fuqua

(57) ABSTRACT

An apparatus for storing both coffee in a reservoir and nested stacks of cup-shaped coffee filters, and then automatically filling individual filters with selected amounts of coffee and brewing the coffee while protecting the reservoir. Through a series of gears, an electric motor rotates an elastic projection with teeth and a disengaging curved tooth against the topmost filter in the stack, dragging it into a filter well beneath a coffee storage receptacle and then dropping it. Simultaneously, a rotating coffee dispenser fills with a selectable quantity of coffee and then dumps the coffee into the filter. The apparatus also includes a stirring device for insuring the stored coffee falls to the bottom of the coffee receptacle. A hot water dispenser operates in conjunction with a valve means for cutting off steam from the coffee reservoir.

9 Claims, 18 Drawing Sheets

Prior Art

Prior Art

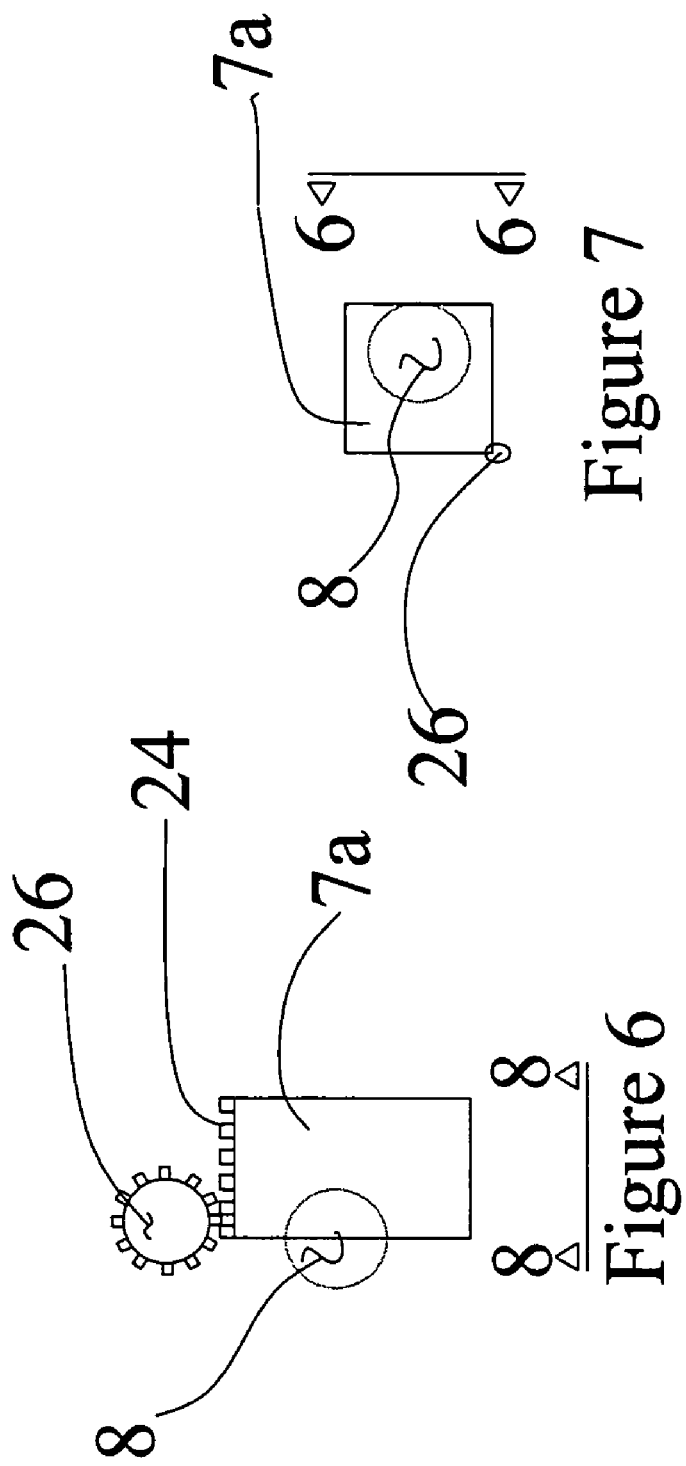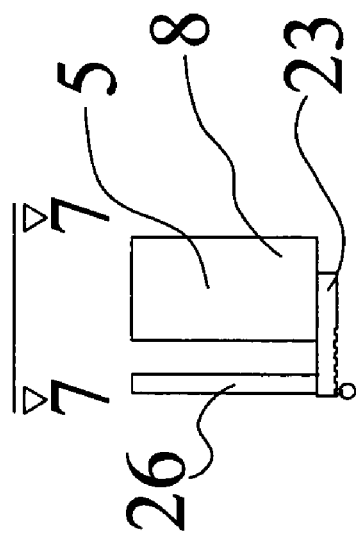

APPARATUS FOR STORING SEPARATING AND FILTERING COFFEE FILTERS

PRIORITY

This patent claims priority based on provisional patent application 5,799,713 filed Dec. 16, 2004.

BACKGROUND OF THE INVENTION

U.S. Pat. No. 5,799,713 to Moore, shows a mechanism for dispensing a filter into a tray in a measured amount using a coffee dispenser 42 having a single cavity 56 for measuring coffee.

1. Field of the Invention

This invention relates to coffee storage canisters and to automatic drip coffee filters, and more. particularly to an apparatus which stores coffee and coffee filters and automatically separates and fills individual filters with coffee for brewing.

2. Description of the Related Art

Coffee storage canisters are of course well known. Further, as can be seen by reference to U.S. Pat. Nos. 4,121,726; 5,067,627; 5,097,984; and 5,197,630, the prior art is replete with devices for storing nested stacks of cup-shaped coffee filters and then individually dispensing the filters. However, none of these devices store coffee as well as filters, and then fill individual filters with coffee in preparation for brewing.

GENERAL DISCUSSION OF THE INVENTION

The present invention discloses an apparatus for storing coffee and stacks of coffee filters as well as a method of dispensing these and pouring coffee through these without requirement of a person handling the coffee and filters.

The primary purpose of the invention is a method of dispensing a powdered or ground substance (coffee, tea, etc.) from a storage reservoir having an amount for specified numbers of use into a water receiving reservoir for the purpose of dissolving, in part, the substance while protecting the unused portion of dispensed substance powder or granulated (or flaked substance.)

The preferred embodiment of granulated or flaked substance is a ground coffee or tea product.

One aspect of the invention is to provide a mechanism to insure that a proper measure of the substance is dispensed for a particular use and in order to insure that the dispensed substance can be partially dissolved without an excessive amount of moisture reaching the un-dispensed portion in the reservoir.

A further concept is to allow the device to be mechanized with a minimum number of moving parts in order to insure that the user does not have physical contact with the substance after it is initially loaded into the dispenser.

A reservoir for containing pre-ground coffee or a reservoir for holding coffee is located above a brewing mechanism.

At least one measuring means is used for measuring at least one pre-specified amount of coffee located below the said reservoir. The measuring means further comprises a release means for releasing the pre-measured quantity into a final location below the measuring means through a funnel means. A blocking means is used for blocking the movement of Steam from hot water dispensed below the funnel means. A basket means is used for receiving the coffee below the funnel means and further defined as receiving a water heating dispensing means having a water dispensing means and wherein said water dispensing is a portion of the filter means preferably inside and along the perimeter of the filter holding means.

A vacuum means maybe present for presenting a partial vacuum or cooling the powdered substance in order to increase the lifetime.

Using mechanical or motor actuating mechanisms an elastic projection with a unique frictional grasping mechanism is rotated against the top most filter in a stack and pulls it then drops one filter into a place with an aligning means for holding the filter and receiving coffee and hot water to brew the coffee under the funnel means for limiting the movement of steam into the coffee reservoir. After the coffee filter is put in the appropriate location, a rotating coffee measurer and dispenser fills a coffee funnel which releases the coffee into the filter and then seals the bottom of the coffee funnel to allow hot water to go into the filter within the filter funnel without allowing the hot water from the steam into the coffee reservoir.

A rotating coffee dispenser (preferably a drum) selects a quantity of coffee and dumps the coffee into the top funnel. The invention may also include a stirring or vibrating device for ensuring that coffee falls to the bottom of the coffee receptacle and to ensure that the coffee is dispensed appropriately into the dispenser.

It is therefore one object of the invention to provide a method of preparing a dispensable substance to be diluted with water over a period of time and in particular with filter and heated water so that subsequent users need not come into physical contact with the substance or any of the ingredients to be added to it prior to the ultimate dispensing of the final product or the requirement to add additional initial powder substances.

A further object is to provide a mechanism for providing this which can be hand operated or mechanically operated.

As a further object of the invention is to provide a method for dispensing coffee or tea utilizing a mechanism which has a storage means which is gravity fed into a hot water filtered basket which is the way the steam from the hot water does not affect the outer reservoir.

These and other objects and advantages of the invention will become better understood hereinafter from a consideration of the specification with reference to the accompanying drawings forming part thereof, and in which like numerals correspond to parts throughout the several views of the invention.

BRIEF DESCRIPTION OF DRAWINGS

Other objects, advantages, and novel features of the present invention will become apparent from the following detailed description of the invention when considered in conjunction with the accompanying drawings, wherein:

FIG. 6 shows a side view of an alternate embodiment a valve for the funnel.

FIG. 7 shows a bottom view of the embodiment of FIG. 8 through the axis 7-7 showing the door.

FIG. 8 shows the view in FIG. 6 as the door is moved to the open position along the 8-8 axis.

In FIG. 19 there would be a means for selecting which of the four dispensers 42 were opened in order to receive either fluid or coffee. Hence, it can be seen that dispensers 42 are nothing more than a means for regulating the flow of coffee from the reservoir 14 in a measured amount to the filter 45.

DETAILED DESCRIPTION OF THE PREFERRED EMBODIMENT

Figure 1:
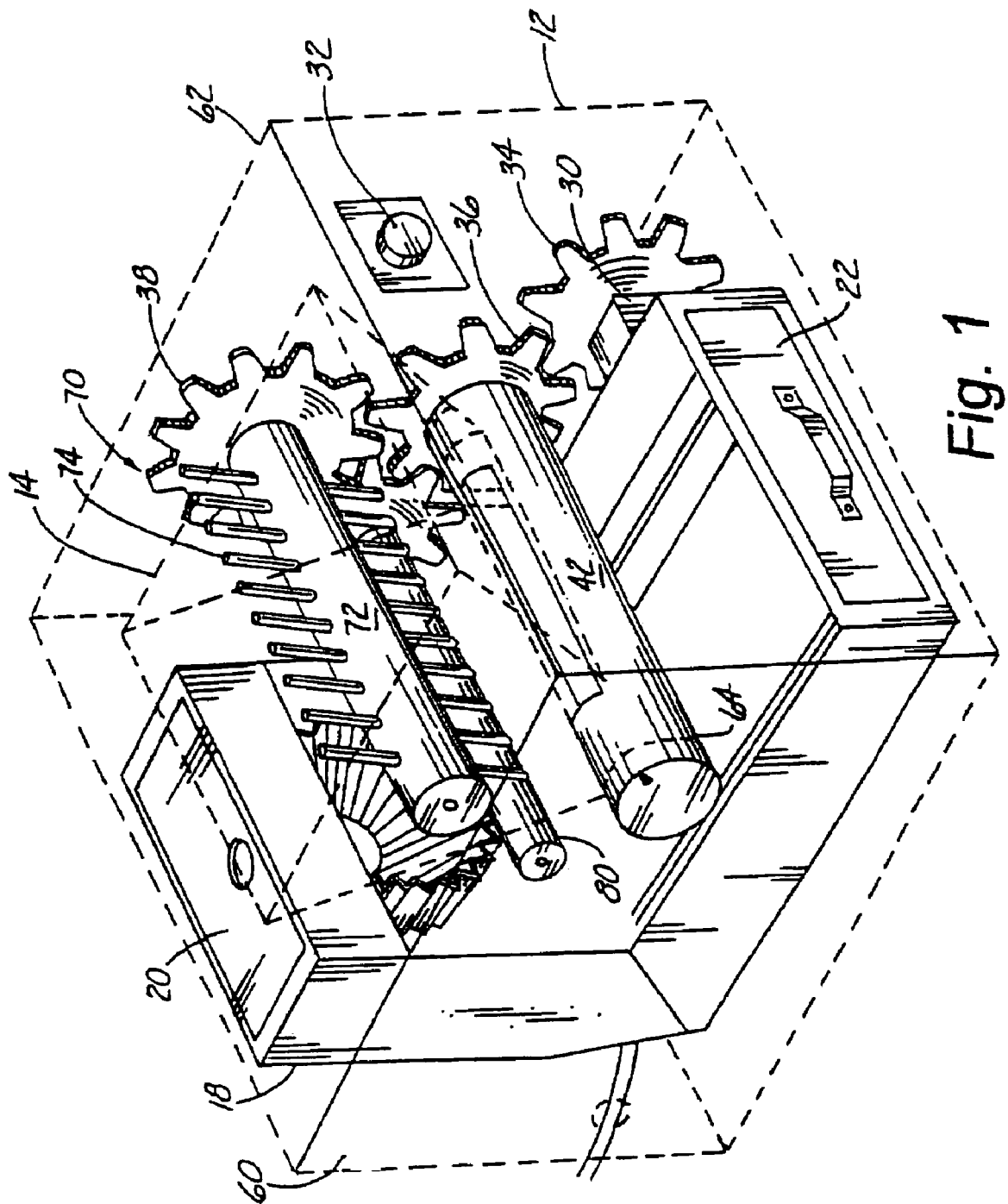
FIG. 1 is a perspective, diagrammatic view of the prior art with the external case shown only in an outline so as to view the internal components.
Figure 2:
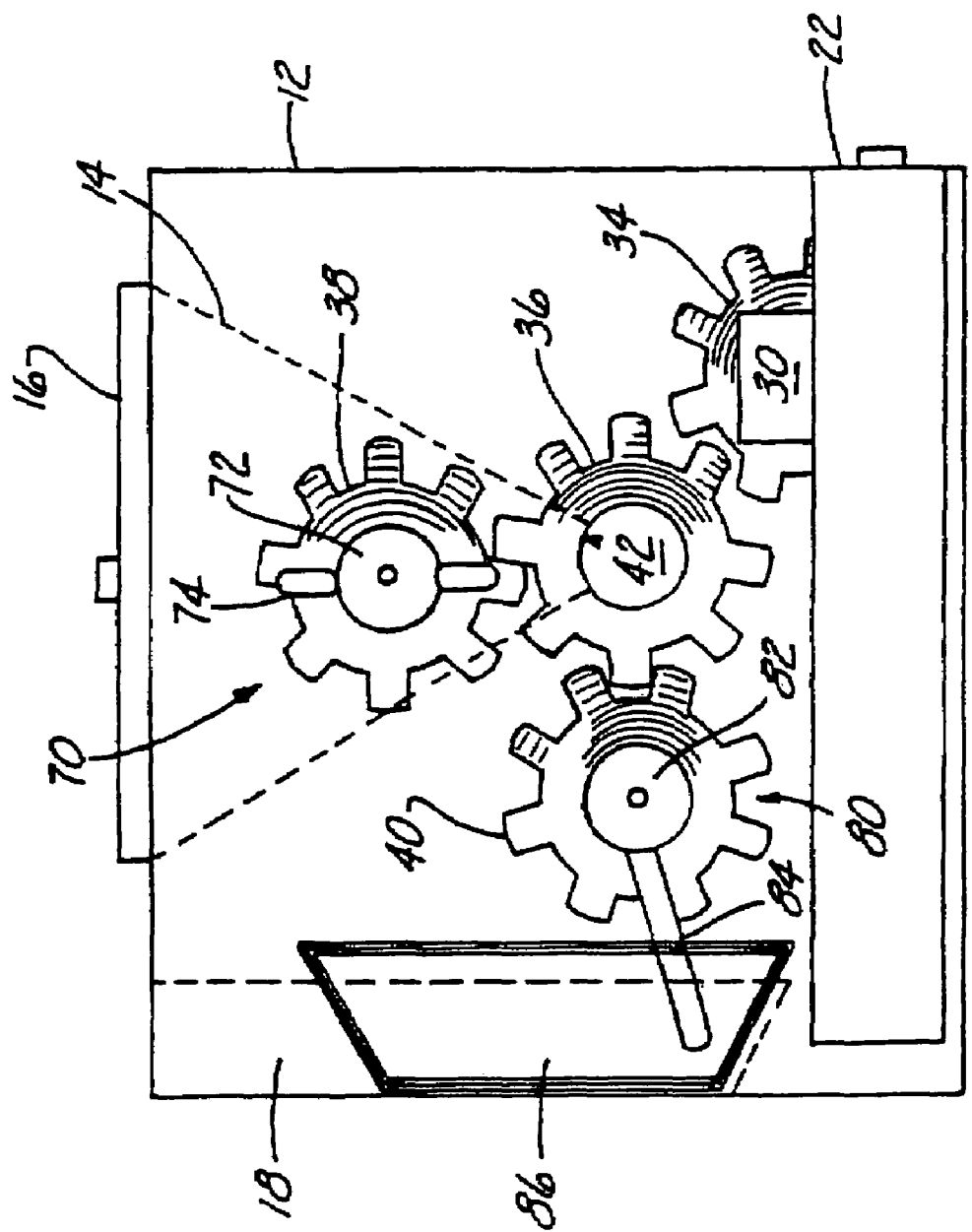
FIG. 2 is a diagrammatic sectional side view of the embodiment shown in FIG. 1.
Figure 3:
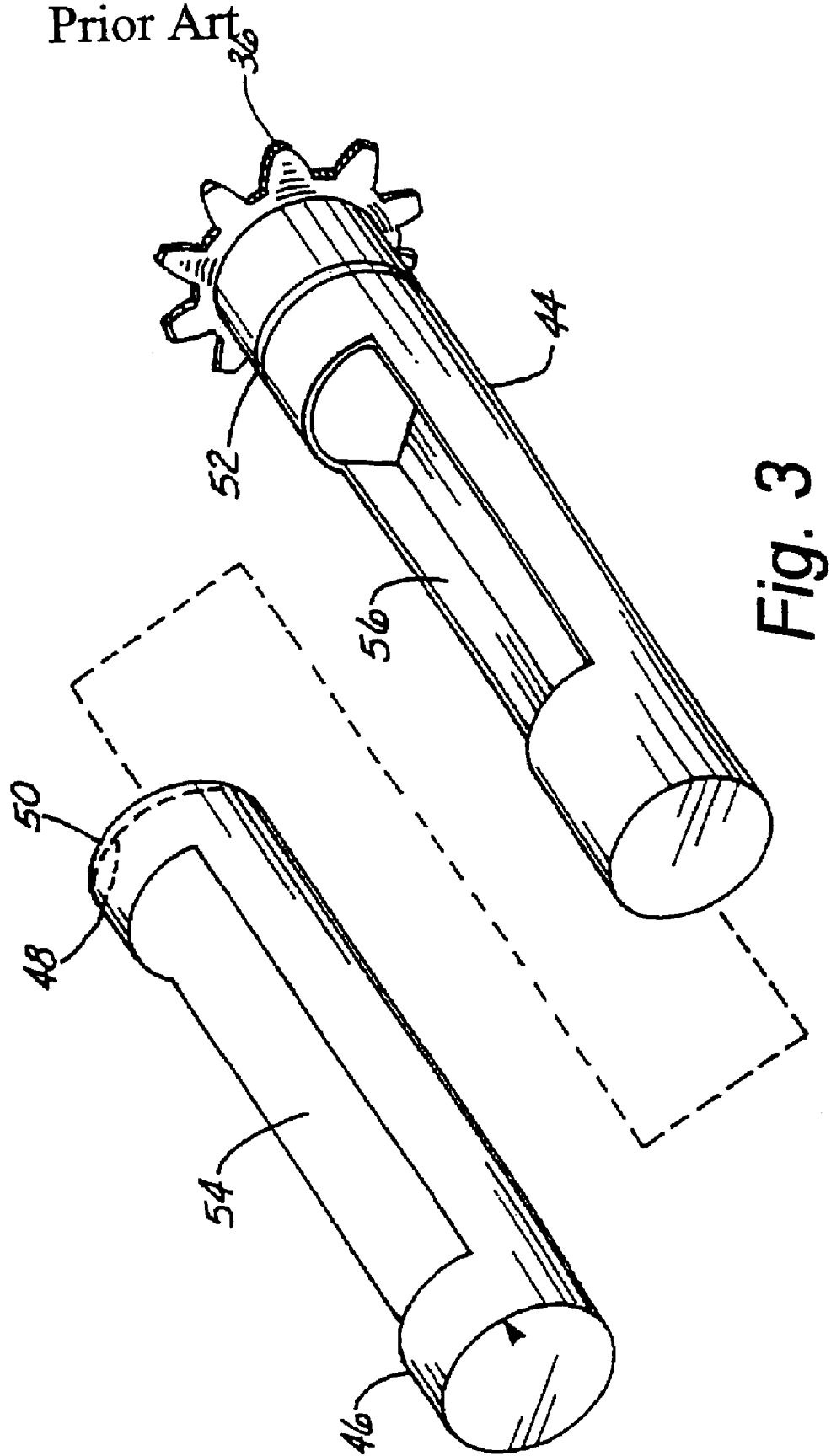
FIG. 3 is an exploded perspective view of the measuring device.

FIGS. 1, 2, and 3 shows a related prior art method of measuring a given amount of coffee into a filter.

Figure 4:
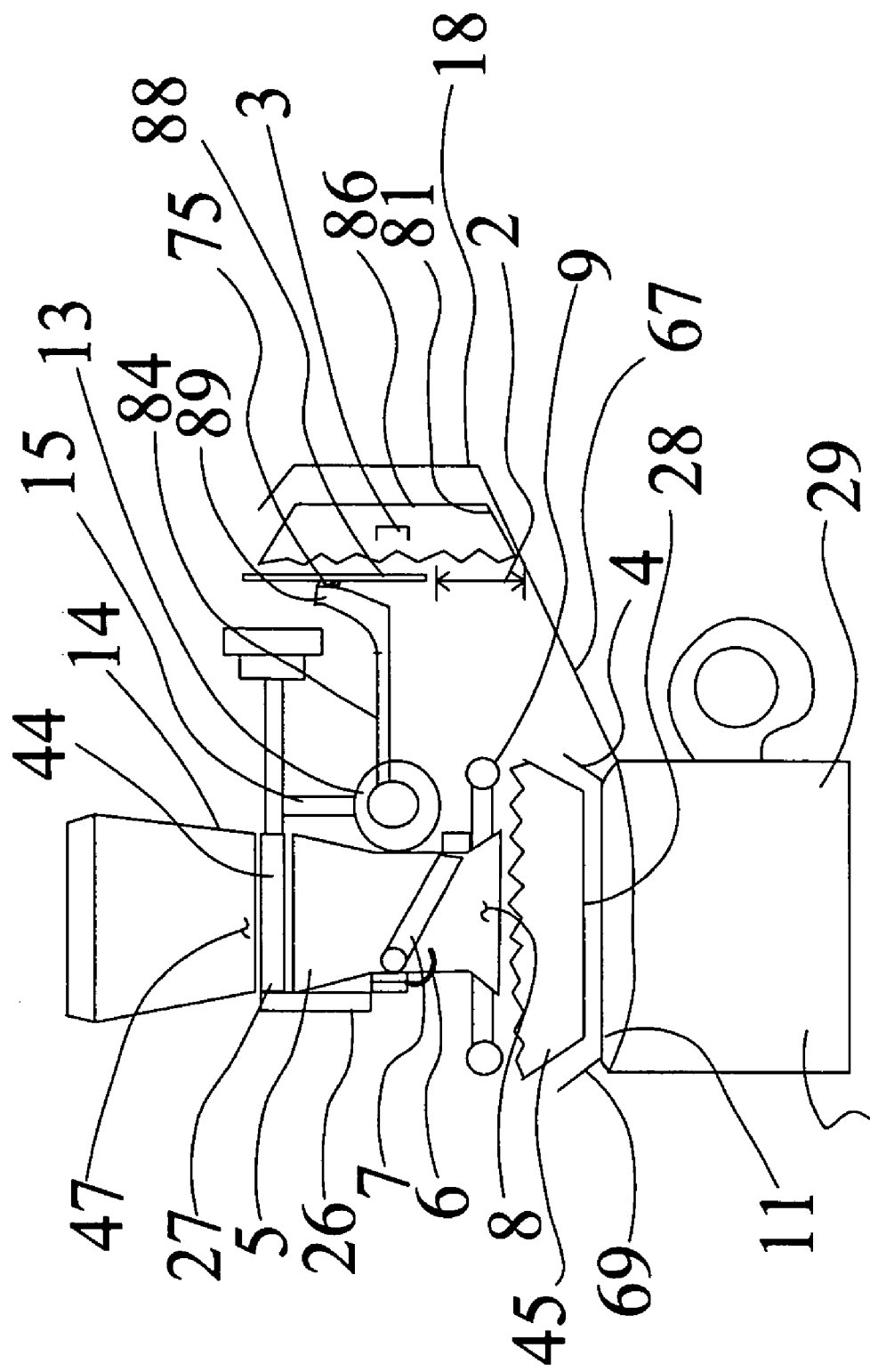
FIG. 4 is a side view of the invention with the enclosure removed.
Figure 5:
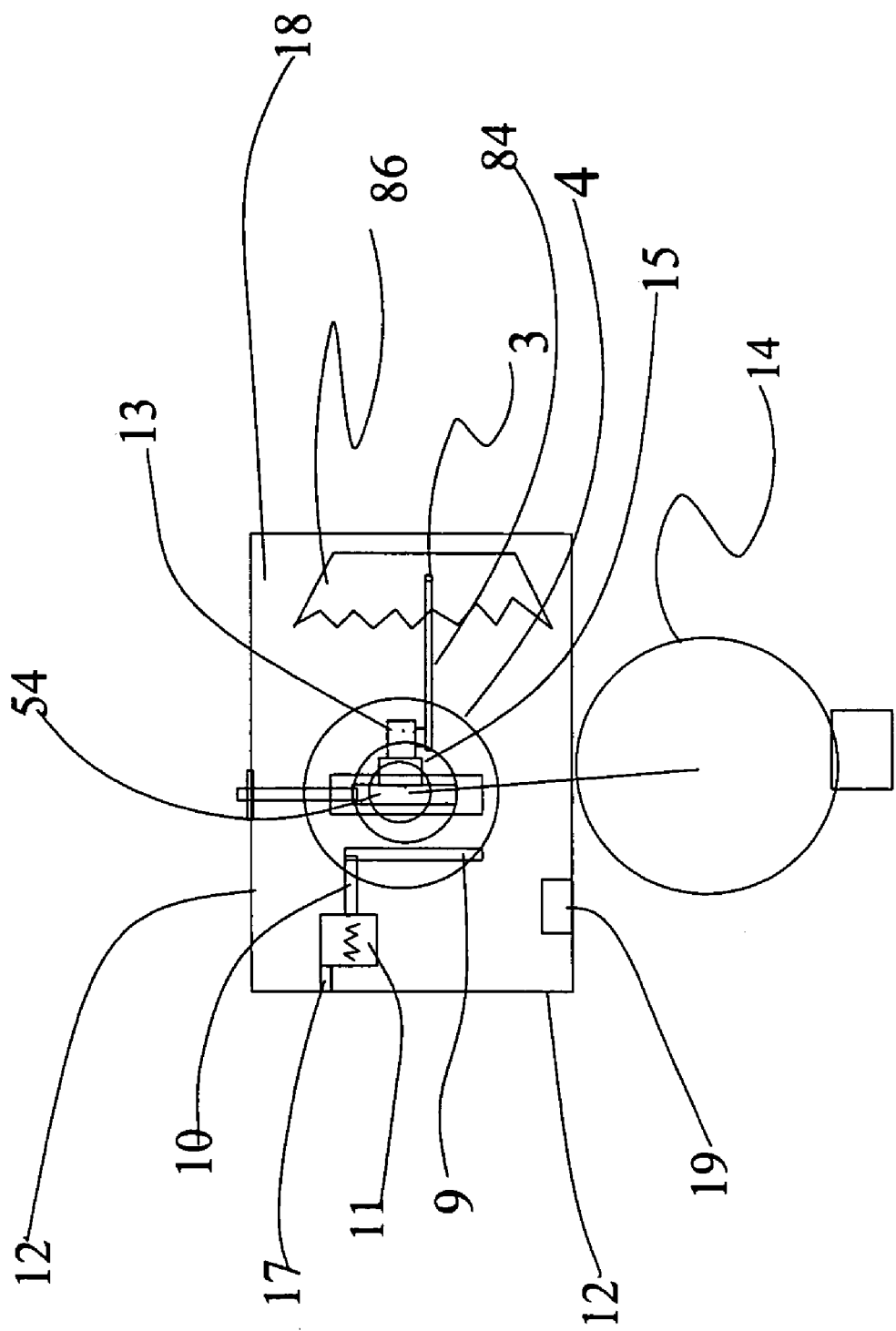
FIG. 5 is a transparent top view of FIG. 4 through the 5-5 axis showing the coffee
Figure 9:
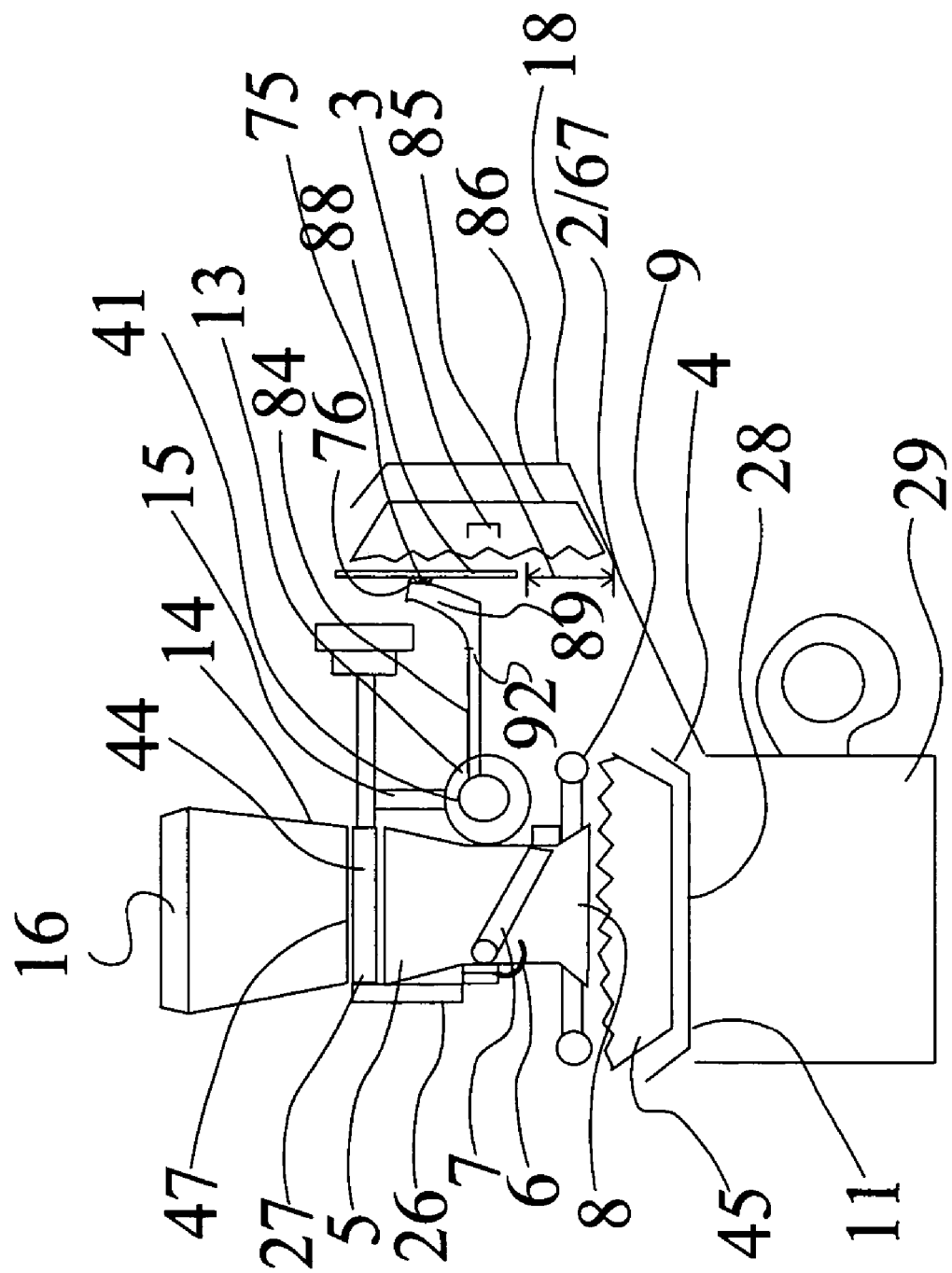
FIG. 9 is a cross sectional view of the filter dispense showing the functional parts as the elastic projection 84 bends against the plastic glider 88 before being released at the gap 85 between the bottom of the glider 88 and the bottom of opening 87 of the filter opening 77.

FIG. 4 and 5 show respectively a cross-sectional view and a transparent top view of the preferred embodiment of the invention taking the elements from FIG. 1, 2 and 3 and incorporating them into a mechanism allowing for the brewing coffee.

As can best be seen by reference to FIGS. 4 and 5, looking at the invention from the top (respectively), there is a coffee storage receptacle 14 to serve as a reservoir for coffee beside which is a filter storage receptacle 18 storing a stack of filters 86. There is also a guide passage 2 so that as the frictional contact, teeth 75 of comb in FIG. 3 and rubber tip 3 in FIG. 4, at the end of the elastic projection 84 contacts the top filter 45, it pulls the filter through the guide passage 2 down ramp 67, into the filter well 4. This is done by operation of a filter arm motor 13 which also turns feed gear 15 which turns the cylinder 44 so that it is alternately exposed to an opening 47 at the bottom of the coffee storage receptacle 14 to receive coffee and then is spun upside down in order to empty the coffee from a cut out 54 in the cylinder 44 into the funnel 5. A spring 6 is a spring means for allowing the valve 7 to open to allow the coffee to drop into the selected filter 45 and then re-closing the valve 7. The valve 7 may be forced open by operation of the spring gear 26 which in turn spins against the geared end 27 of the coffee dispenser 42 or the spring 6 may just give way to the weight of the coffee that comes into it.

The coffee then comes out of the filter exit 8 and falls placed into the selected filter 45 waiting in the filter well 4.

Another way of accomplishing this same thing is shown in FIGS. 6, 7, and 8 which shows how the funnel valve 7 is replaced with a door 7a which moves according to the spring gear 26 against teeth 24 on the door 7a to open the door and then back to close the door and the funnel exit 8.

As shown, a hand crank or one geared motor may operate all the parts together or they may be operated by separate motors controlled by a motor controlling means which may be a cpu (not shown) or other device for controlling the sequential operation of the gears and other moving parts.

Having one set of gears sequentially controlling all parts is preferable to simplify operation. The motors may shut off automatically or by action of the user.

The spring gear 26 may reverse direction in accordance with means known for reversing motor direction or gear directions after a certain point in travel as known in the prior art or it may rotate from an opened to a closed position, as shown in FIG. 7, where the door 7a is attached to and rotates around the spring gear 26 opening and re-closing the door 7a.

The filter well 4 has a filter well bottom 28 which defines openings (not shown but in the prior art) so that the solvated coffee from the filter may drop through into the coffee pot 29.

In order to brew the coffee, there is a tube 17 to a water source (not shown but in the prior art) which water source supplies a predetermined amount of water as by water in a reservoir (not shown but in the prior art). A water heater 11 heats the water which then flows through water tubes 10 to a water drip 9 which is above the filled filter and on at least one side of the funnel exit 8 in order to minimize the hottest water from traveling back into the funnel exit 8.

In this way, the invention provides that a coffee filter may be dressed in place over the filter well 4 and then filled with coffee and have hot water added without having heated fumes move directly up into the coffee reservoir or the opening of the coffee reservoir into the cylinder 44 of the coffee dispenser 42. A fan 19 may assist in pulling steam from above the filter wall to the housing and flow steam out of the housing 12.

Referring now to the drawings, wherein like reference numerals designate identical or corresponding parts throughout the several views, the prior art is depicted in FIG. 1 with the housing 12 shown in phantom so that the internal components may be seen. The housing 12 and most other components of the invention are preferably fabricated from molded plastic, although other materials may be appropriate. The invention incorporates the elements of a funnel-shaped coffee storage receptacle 14, accessed through a cover 16, and a filter storage receptacle 18, accessed through a separate cover 20. The coffee storage receptacle 14 is preferably capable of storing at least several servings of coffee, while the filter storage receptacle 18 should hold a nested stack of at least fifty cup-shaped coffee filters 86. In the current embodiment, clear up inspection port or sensor would prevent operation when the filter storage receptacle 18 is empty. The lower portion of the housing 12 (in the prior art) includes a drawer 22 for removal of the coffee filters after they have filled, the invention replaces this as discussed above.

The invention as shown in the prior art, may be powered by a 12 volt electric motor 30 which turns a first gear 34 through one revolution each time it is actuated by a pushbutton 32. The first gear 34 is in driving contact with a second gear 36, which is in turn in driving contact with a third gear 38 and a fourth gear 40. These four gears 34, 36, 38, 40 are each of identical size so that as the first gear 34 rotates through one revolution, so do each of the three remaining gears 36, 38, 40.

Second gear 36 is secured to and drives a coffee dispenser 42, also seen in FIG. 3, which comprises a sleeve 46 which slides over and may be manually rotated upon a cylinder 44. The sleeve 46 has a lip 48 within its open end 50 to engage a groove 52 in the cylinder 44 to hold the sleeve 46 on the cylinder 44 while allowing it to rotate about the cylinder 44, albeit with some minimal level of force required to accomplish such rotation. A cutout 54 in the sleeve 46 is adapted to selectively encompass a cavity 56 in the cylinder 44, leaving the cavity 56 open, or to selectively close the cavity 56 by rotation of the sleeve 46 upon the cylinder 44.

As seen in FIG. 1, the coffee dispenser 42 extends between the opposing side walls 60, 62 of the housing 12 and abuts against and seals the semicircular bottom of the coffee receptacle 14. The geared end of the coffee dispenser 42 has a small central spindle 41 which rotates within a small hole in the side wall 62. The non-geared end of the coffee dispenser 42 extends through and rotates within a hole 64 in the side wall 60. This arrangement allows the sleeve 46 to be grasped and rotated upon the cylinder 44, adjusting the size of the opening in the cavity 56. Thus when the coffee dispenser 42 is rotated within the semicircular bottom of the coffee storage receptacle 14 by the 12 volt electric motor 30 through first and second gears 34, 36, a selectable amount of coffee falls into the cavity 56 and then falls out as the cavity 56 is rotated to face downward.

A coffee stirrer 69, comprising a rod 72 having a series of radial projections 74, is rotatably supported by opposing sides of the coffee storage receptacle 14 and driven by third gear 38.

A filter dispenser 80, comprising a rod 82 having an elastic projection 84, is rotatably supported by the opposing sidewalls 60, 62 of the housing 12 and driven by fourth gear 40. As the rod 82 rotates, the elastic projection 84, preferably made of rubber, encounters the top filter in the stack of filters 86 and drags it from the stack and down into the drawer 22, in the prior are and the filter well 4 in the present invention, where it is then filled with coffee by the coffee dispenser 70.

Figure 11:
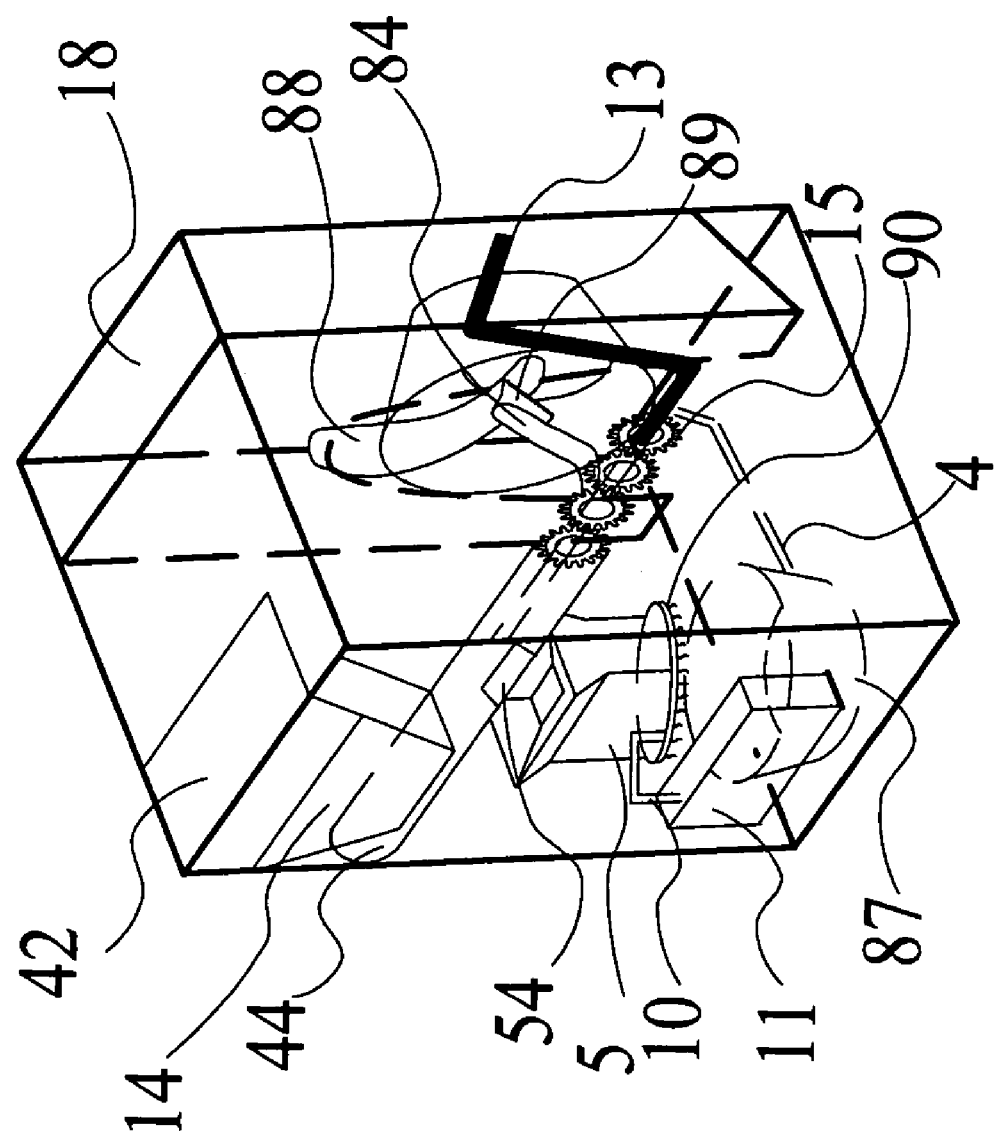
FIG. 11 shows a prospective view of the projection 84 against the plastic glider 88.
Figure 12:
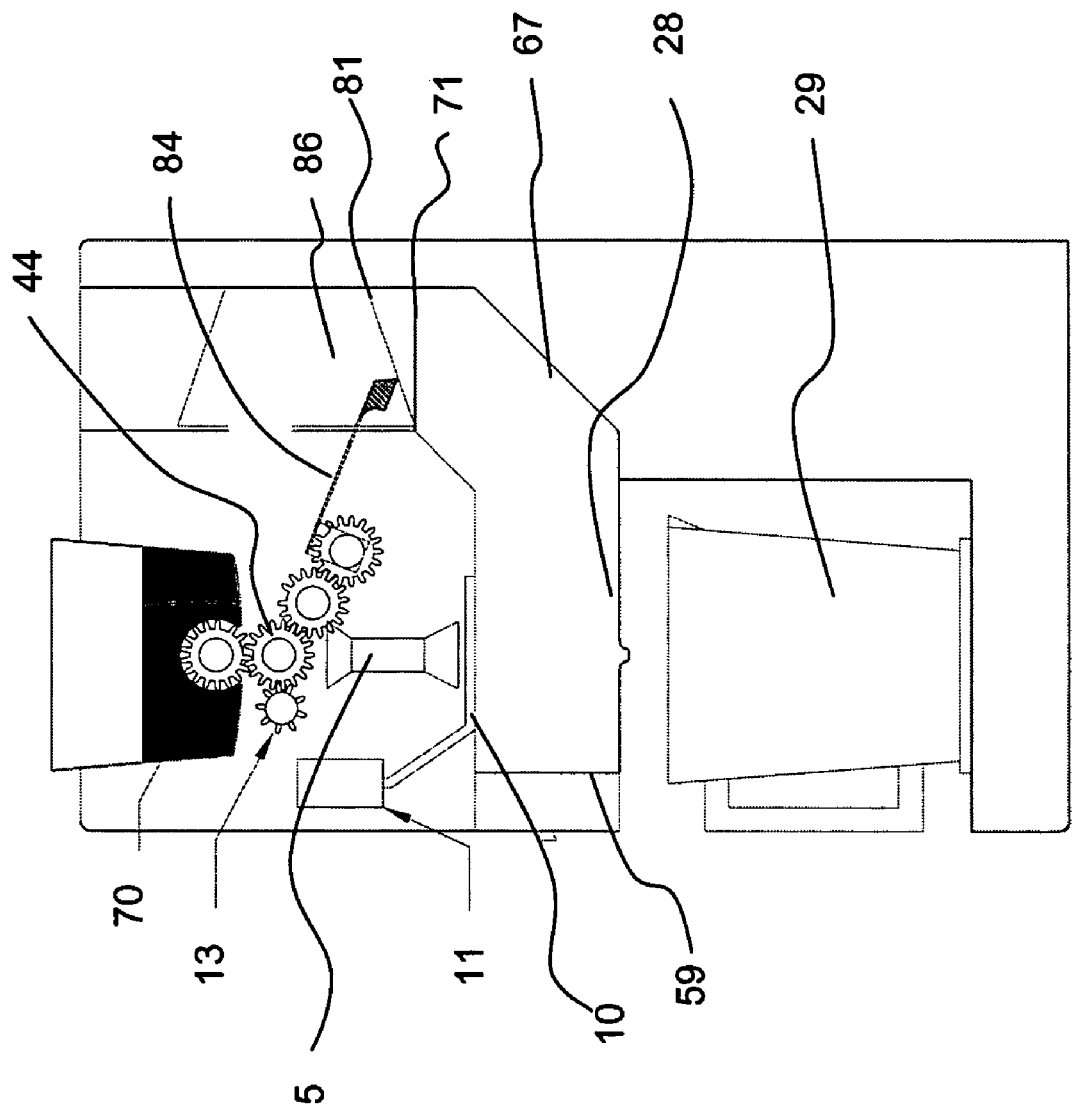
FIG. 12 shows a side see through view of the device with the flexible spindle arm, elastic projection 84 with the serrated teeth 75 and combs 89 beginning to contact the bottom slant 81 of the stack of filters 86.
Figure 13:
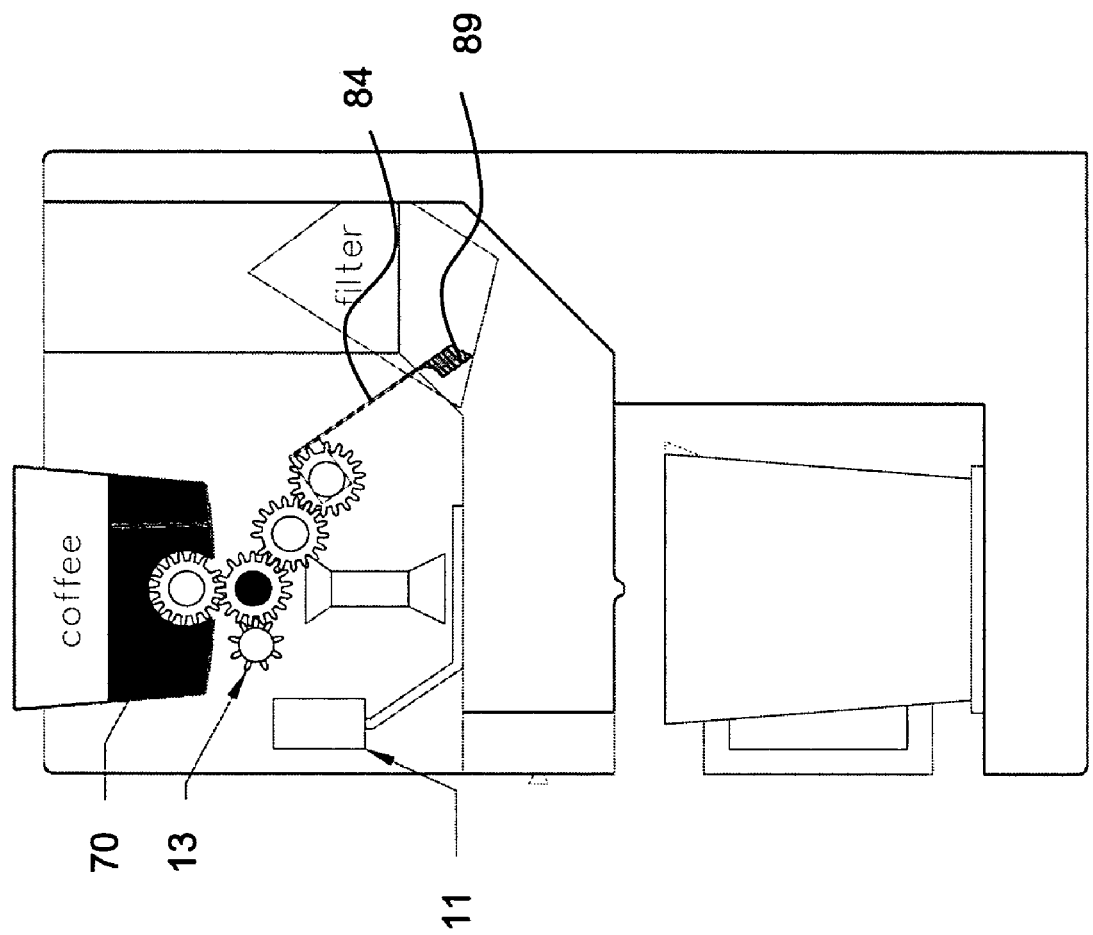
FIG. 13 shows a filter being pulled out of the filter slot with the teeth behind the curved front tooth 83 beginning to release from the filter so that only the end curved front tooth 83 which functions as a releasing means 76 to push the other teeth 75 out of contact as the elastic projection 84 has straightened out and in response to the filter coming out of contact with the left and right filter walls 65 and 66 respectively as shown in FIG. 10.
Figure 14:
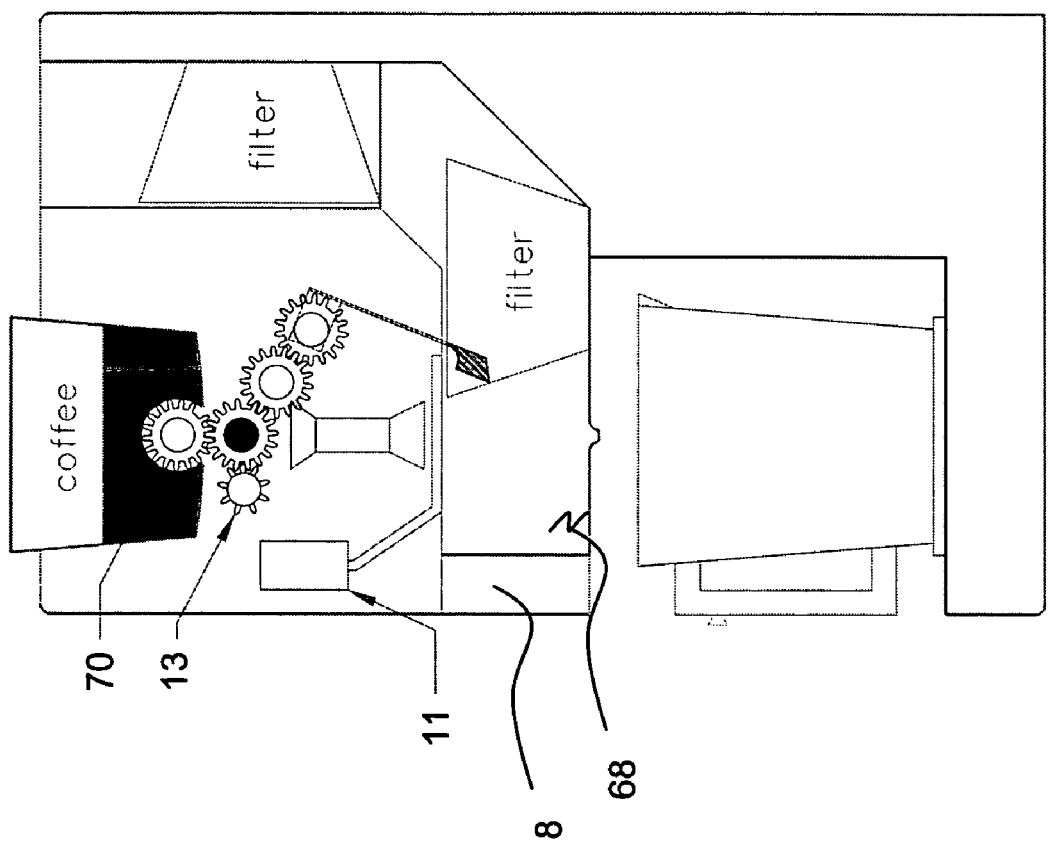
FIG. 14 shows a transparent view of the filter released to the bottom of the filter well 68 with the curved front teeth continuing to pull it below the final exit 8.
Figure 15:
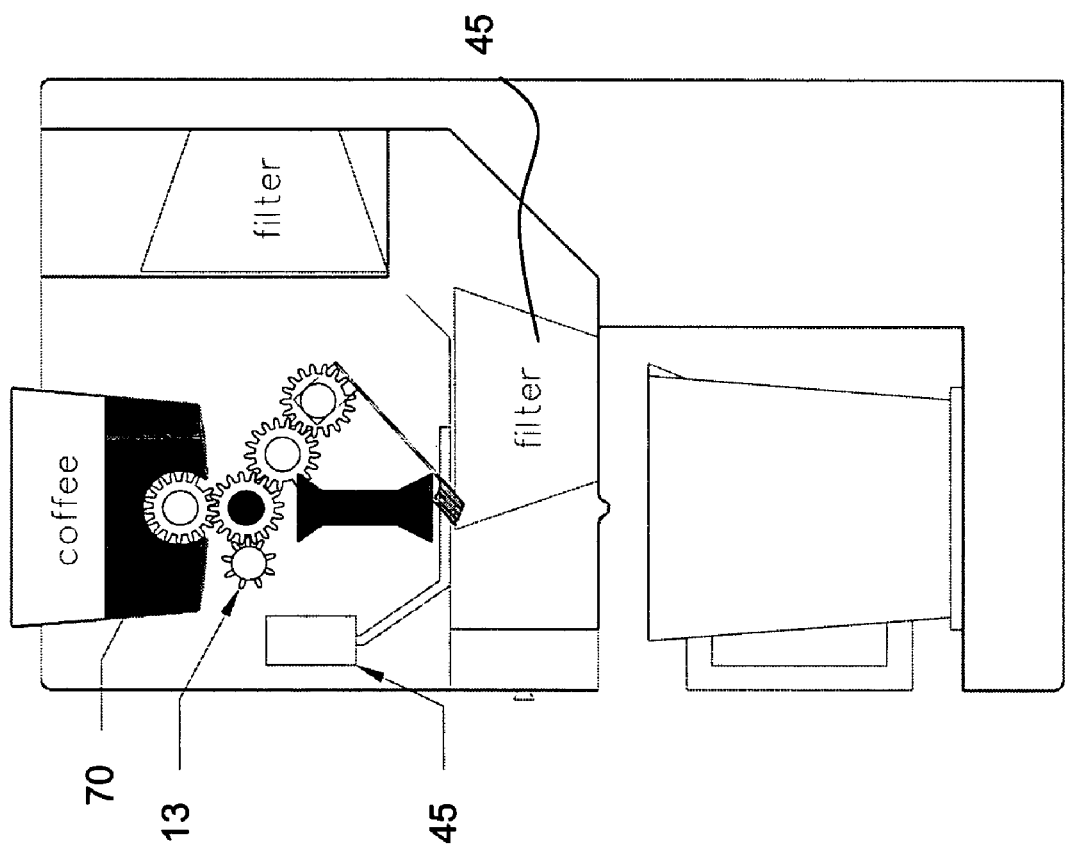
FIG. 15 shows a transparent view as the elastic projection is about to come free of the top of the filter
Figure 16:
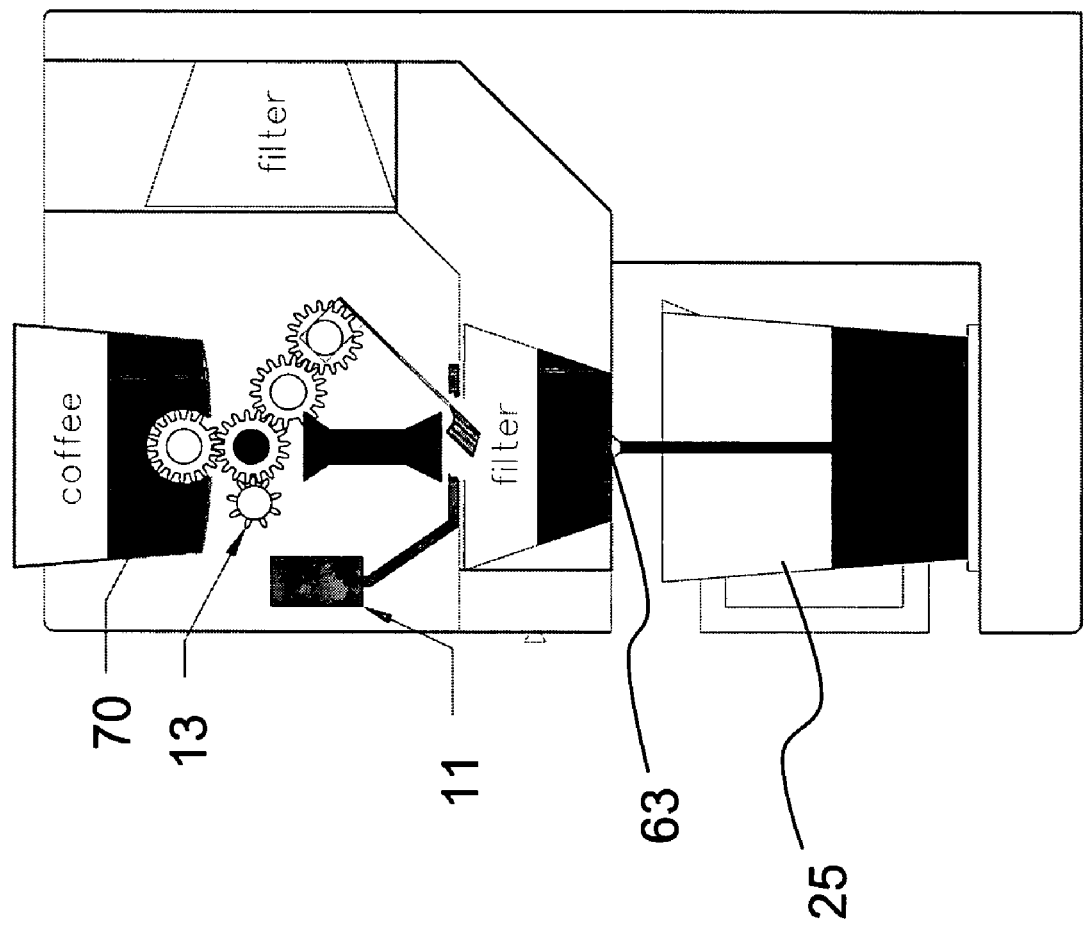
FIG. 16 shows a transparent view of the filter in place after water has been added and has begun to drain through the opening 63 below the filter into a coffee pot 25.
Figure 17:
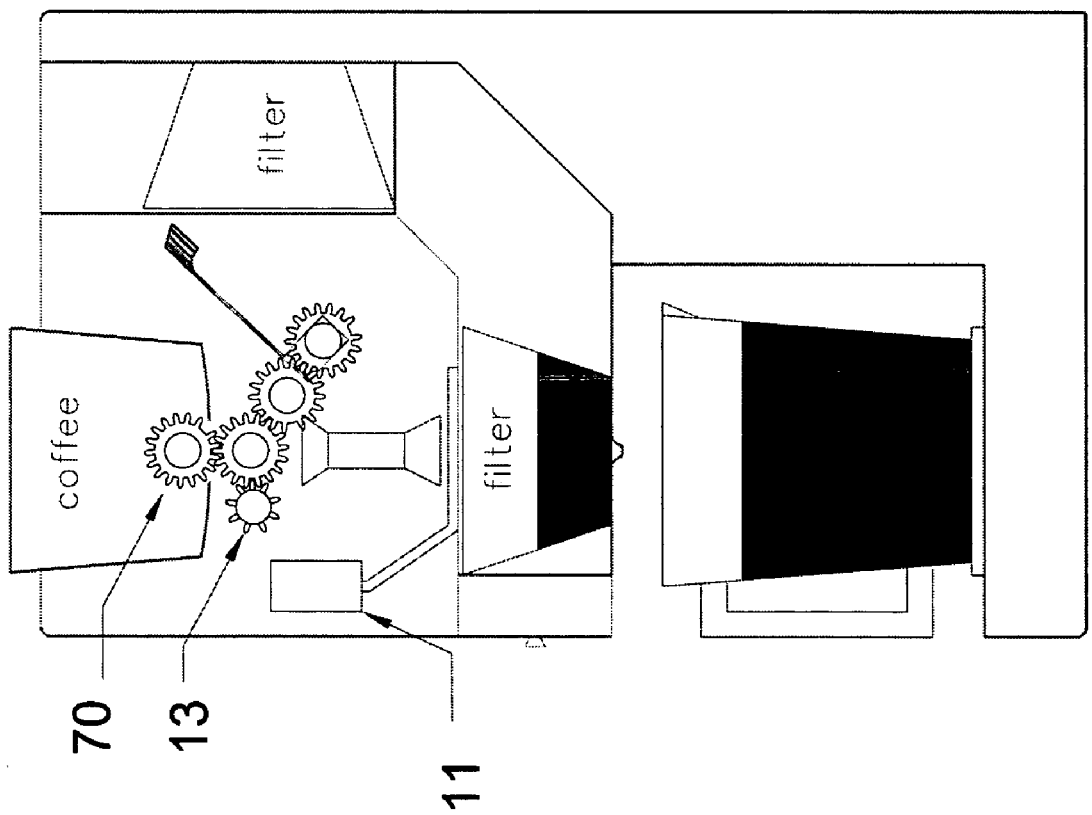
FIG. 17 shows the transparent view of the filtered coffee with the arm now held above the coffee filter and above the glider surface.

As shown in FIG. 11 the parameters of the teeth in the comb can be fairly important.

The front tooth is curved or beveled.

There is approximately ½ inch (between ¼ and ¾ inches) between this beveled end and the first tooth.

There are approximately 10 teeth per inch for the size of the blades and typically the blades are between a quarter of an inch and three quarters of an inch since a quarter of an inch doesn't have sufficient grasping power and three quarters of an inch is too big and can tear the filters.

These parameters might be modified somewhat by adjusting the sharpness.

Figure 10:
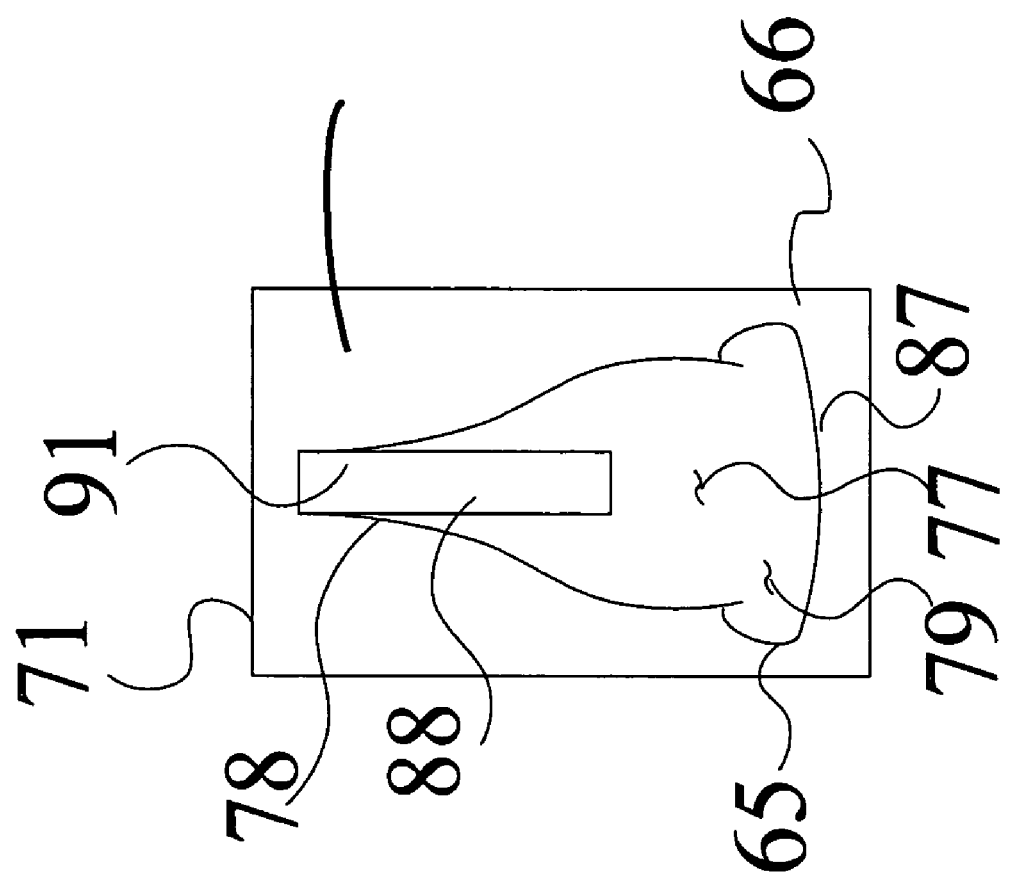
FIG. 10 shows a front detailed view of the plastic glider 88 and the filter opening 77 in the holding wall 71.

The purpose of having the flexible arm with the teeth with the beveled end at the front of the teeth is in order to provide that with an eight inch filter having a six inch width (because the filter is folded) moving through a five inch opening 79 (FIG. 10). The filters need to be dragged through the opening 79 thereby the arm 84 flexes and flexes like a half inch plastic batten as shown in FIG. 11 until it hits the bottom filter wall 81 of the top filter when the teeth grasp the edge of the filter and there needs to be at least one tooth but preferably as many as ten in two parallel rows. The movement through opening 79 compresses the filter and pulls it through the five inch opening 79 and then as the arm 84 straightens out as its resilient nature forces arm 84 into its unbent original shape and completing arm 84 turn toward the point of beginning and the beveled end pushes the filter out of contact with the teeth which are between a quarter of an inch and three quarters of an inch long.

While ten teeth per inch are a preferred measurement, typically anywhere between two teeth per inch and fifteen teeth per inch can work.

The blade needs to be sufficient so it is not so fine as to rip the filters and there needs to be a sufficient number of teeth to distribute the pressure of the teeth over the filter so they don't dig too far.

Operation

Operation of the invention begins by selecting the amount of coffee to be dispensed into the filter. This may be accomplished by rotating the sleeve 46 of the coffee dispenser to adjust the size of the opening into the cavity 56 as shown in the prior art, changing the size of the cavity 56 or by having any mechanical or electronic means available to select an amount dispensed by the reservoir. In the hand-operated version, a crank would be used, in the embodiment showing this is the motor. An electronic motor may have a pushbutton 32 which is then depressed, causing the motor 30 to drive each of the four gears through one complete revolution. As the coffee dispenser 42 begins to rotate, coffee falls from the coffee storage receptacle 14 into the cavity. 56. Simultaneously, the filter dispenser 80 (in the new invention item 84) also rotates and drags a filter from the filter stack and down into the drawer 22 or into filter well 4 in the present invention, below the coffee dispenser 42. As the coffee dispenser 42 continues to rotate, it dumps its contents of coffee into the filter placed below it. In the present invention it goes through the sealable funnels. The filter may be removed by withdrawing the drawer 22, but it is brewed in the embodiment in FIGS. 4 and 5 in place. During the operation, a coffee stirrer 69 (shown in the prior art) also rotates within the coffee storage receptacle 14 to ensure the coffee falls to the bottom. It may be replaced by a vibration or other agitating means.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

In the claims, means-plus-function clauses are intended to cover the structures described herein as performing the recited function and not only structural equivalents but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

By rotating the filter arm motor 13, grinds will fall from the dispenser 42 as the feed gear 15 rotates the cylinder 44. Simultaneously, the elastic projection 84 will slide down the plastic glider 88 which guides a sharp comb 89. Once the comb reaches the end of the plastic glider 88 individual teeth 75 will grab a single filter 45 from the filter storage receptacle 18 through a restricted opening and down a ramp and continue to move the selected filter 45 into the filter well 4 and drop it directly under the funnel 5. A burner 59 may help insure the filter stays in the well 4. As the cylinder 44 rotates to 180 degrees, the grinds will pass through the cut out in the cylinder 44 then fall through the funnel 5 and into the just placed filter 45. The weight of the grinds may trigger the water heater 11 to dispense a pre set amount of water through the water tubes 10 to drop 9 or the motor may dispense water automatically or the user may turn on the water. The water may be from a measured source in a reservoir as shown the prior art. Water will then shower out through the water ring 90 and into the filter on top of the grinds.

Looking at FIGS. 4 and 12-18, the fiction may thereby be described as having a projection gliding means for guiding the elastic projection past the middle of the filters contacting and holding the filters in some embodiments so that the teeth 75 of the comb 89 mounted onto the bottom 73 of the elastic projection 84 only contact the filter when the comb passes by the top of the filter and contacts the bottom slant 81 of the next filter to be dispensed through the filter opening 77. As can be seen where the gliding means (glider 88) is long enough, it is pressed by the projection 84 into the filters to hold them in place and is then released when the projection passes by the glider (thereby releasing it) to glide or snap (depending on the distance traveled past the glider) onto the filter slant 81. The glider 88 preferably flexes, but need not in all embodiments.

The left filter wall 65 and the right filter wall 66 (FIG. 10) serve to be slightly less wide than the width of the filter so that the filter is pulled through the total opening 79 at the bottom of the filter opening 77 after the filter arm has passed through the arm opening 78 over the plastic glider 88 to contact the bottom slant 81 of the filter to be dispensed so that the filter pops out assisting the curved front tooth 83 (FIG. 18) and pushing the rear teeth 75 of the comb 89 out of contact with the filter so that the filter may be released and dropped into place in the wall 4 below the coffee pot 25.

There is preferably an access opening allowing the user to adjust the position below the coffee pot if individual filters are not removed and placed below a separate coffee pot.

The glider may be replaced with a wall which holds the filter above the location where the flexible elastic projection 84 comes in so that the plastic glider 88 may be eliminated.

In the preferred embodiment the elastic glider 88 may move backwards slightly in order to assist in holding the filters in place until the comb 89 of teeth 75 are at the proper location to grab the filter.

Figure 18:
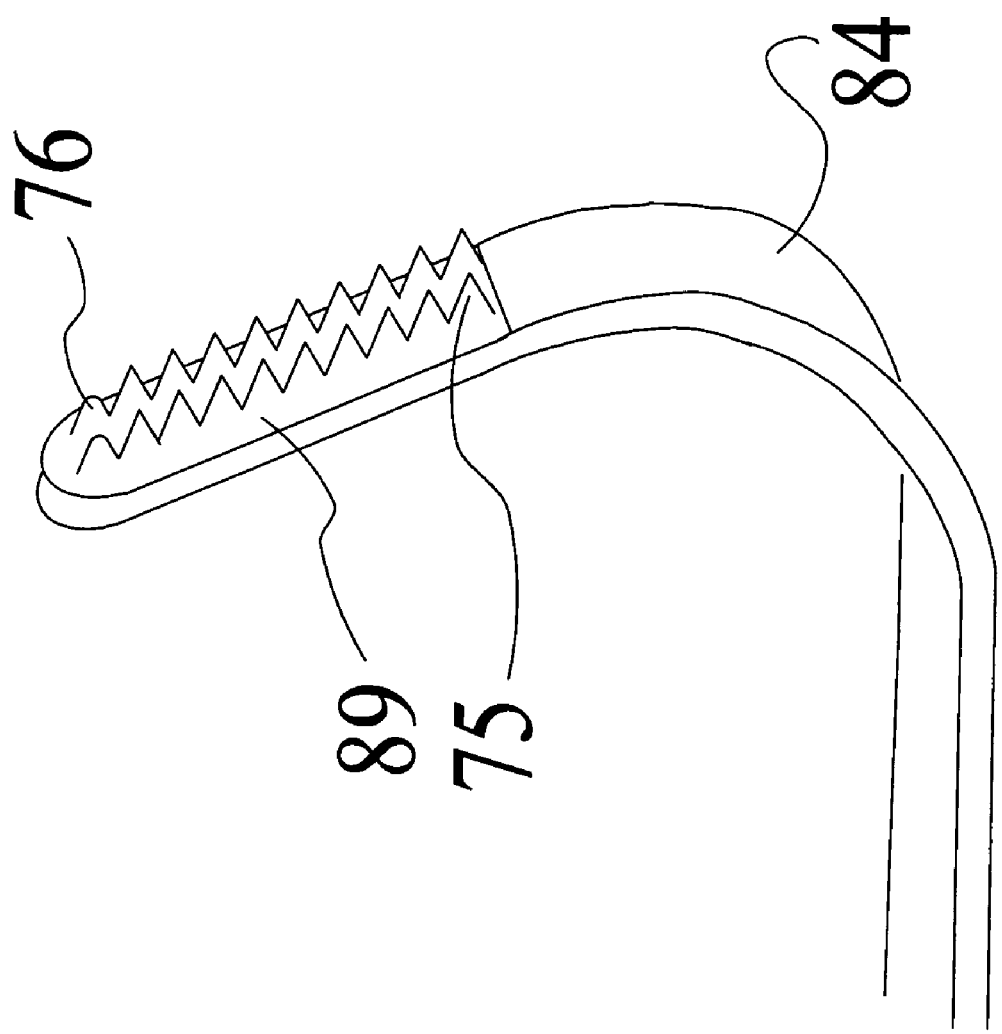
FIG. 18 shows a detailed view of the elastic projection 84 showing how it bends when it comes in contact with the plastic glider 88.

The comb has two rows of teeth in the embodiment shown in FIG. 18 at least the first tooth of either side of the comb or on one side of the comb may be curved so as to push the sharpened back teeth out of contact with the filter as it drops down the ramp. Also, the teeth may be set back enough so the curved form with the elastic project serves the functions of the front curved tooth.

Figure 19:
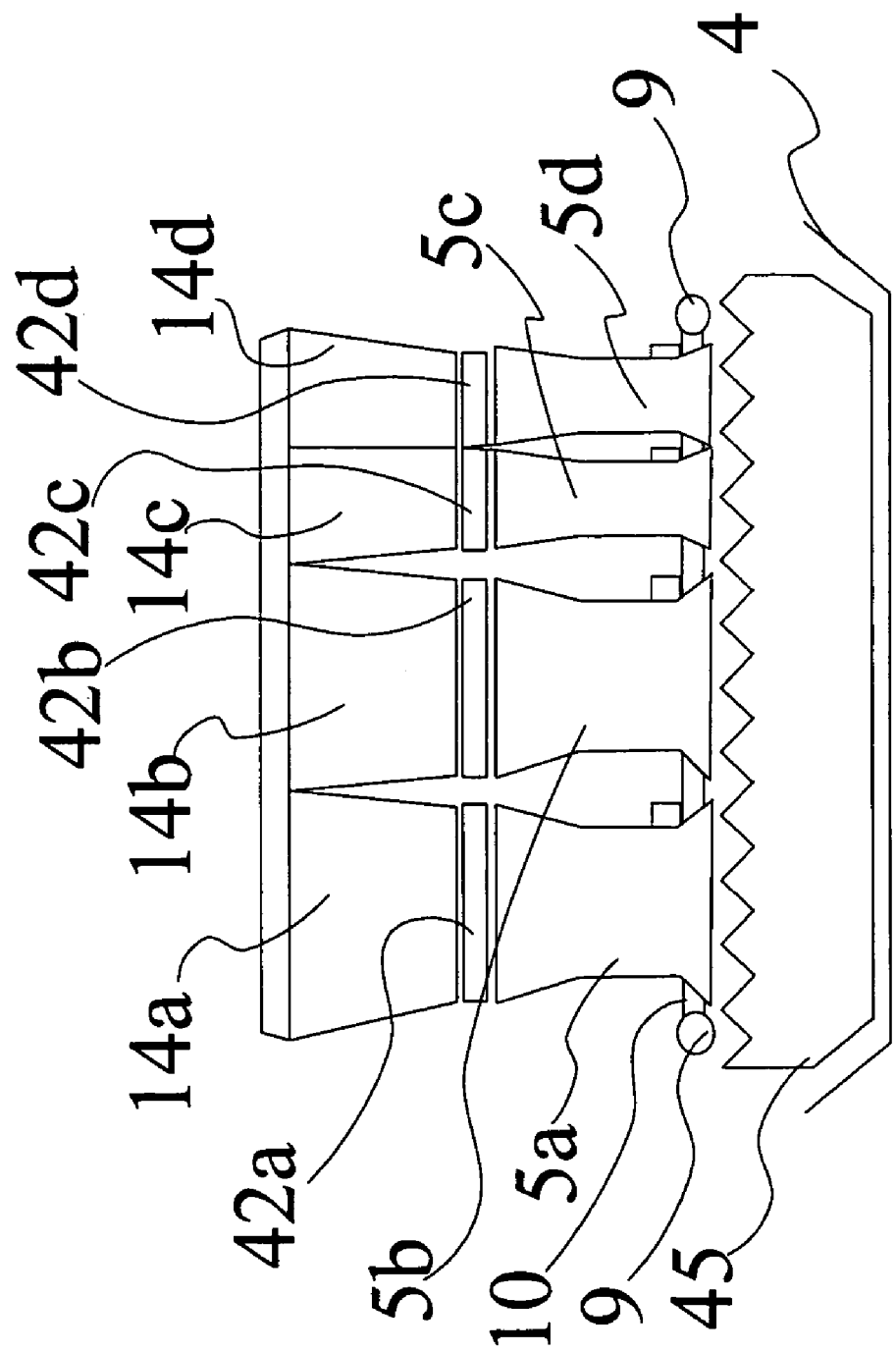
FIG. 19 shows a cross section of an alternate embodiment providing for multiple coffees and flavors to be dispensed into a given filter at the election of the user.
Figure 20:
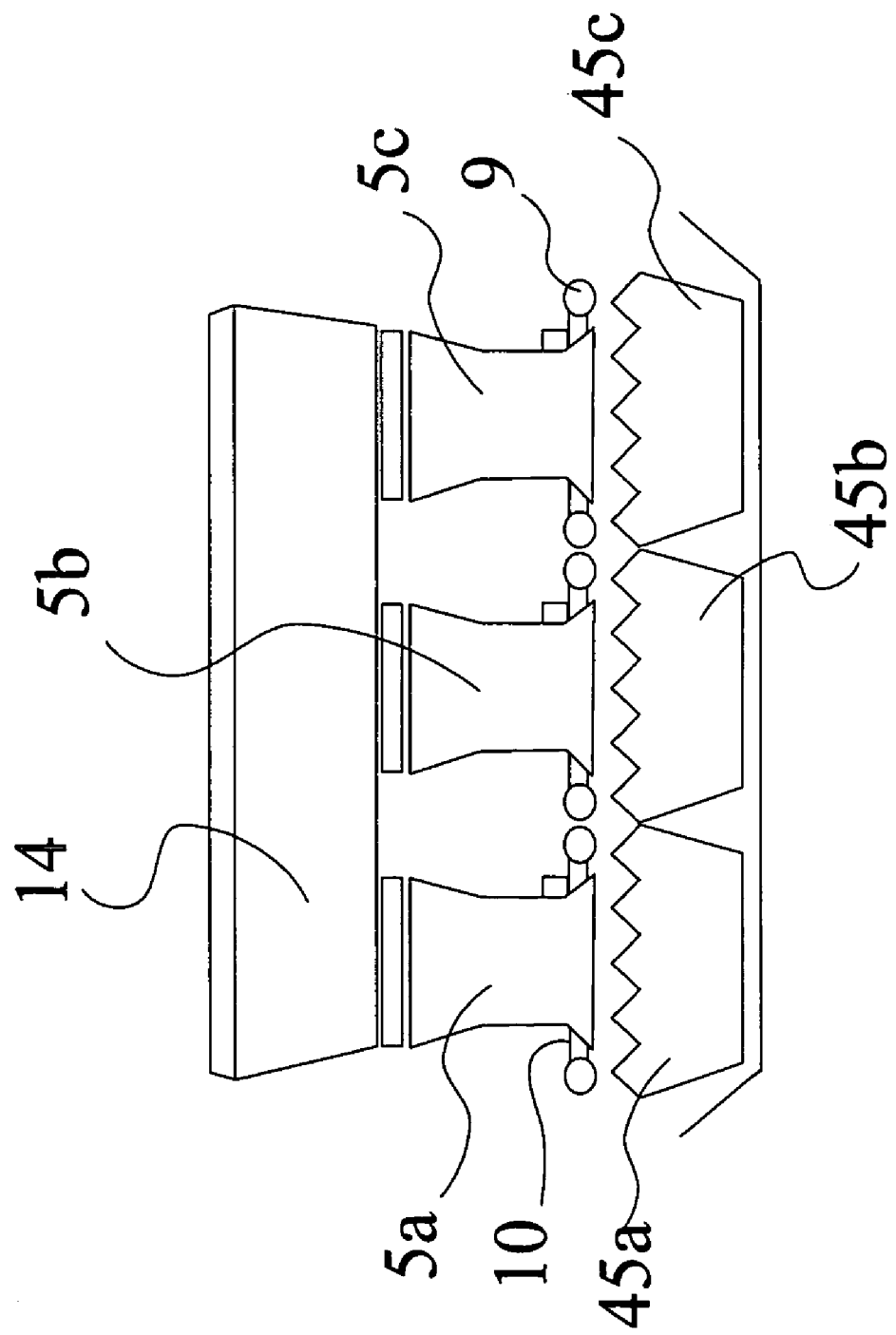
FIG. 20 shows how multiple filters may be used with multiple funnels from a single reservoir where usage would require this.

As can best be seen by FIG. 19, one method of practicing the invention allows for multiple reservoir 14a-14d emptying into multiple funnels 5a-5d respectively with the other elements being the same.

In this way, the user can select which type of coffee he wants to dispense 14a and 14b and choose from one of at least two flavors from 14c and 14b.

Because many varying and different embodiments may be made within the scope of the inventive concept herein taught and because many modifications may be made in the embodiment(s) herein detailed in accordance with the descriptive requirements of the law, it is to be understood that the details herein are to be interpreted as illustrative and not in a limiting sense.

What is claimed is:

1. A device for delivering a single filter to be filled with coffee comprising:
   (A) A housing;
   (B) A first receptacle situated within said housing for storing coffee;
   (C) A second receptacle situated within said housing for storing a stack of coffee filters;
   (D) A filter well 4 means for holding a filter;
   (E) A filter delivery means for moving a single filter from said stack of filters to the filter well below said first receptacle and wherein said filter delivery means further comprises a grasping means for rotationally contacting a filter and rotating said contacted filter and for frictionally contacting the filter at the initial contact of the filters and pushing the filter away when in place in the well and wherein the grasping means comprises a blocking means for preventing contact of the grasping means until the proper location of the filter is reached.

2. The invention of claim 1 where the proper location is the filter bottom side wall.

3. The invention of claim 1 wherein the grasping means further comprises a flexible arm rotationally extendable against the blocking means and then into the second receptacle to contact the top filter along the bottom sidewall of the filter after moving against the glider means until the appropriate location along the filter is reached.

4. The invention of claim 3 wherein the grasping means further comprises at least one frictional contact means at the end of the flexible arm means.

5. The invention of claim 4 wherein the frictional contact means comprises at least one sharpened tooth for grasping the filter.

6. The invention of claim 5 further comprises a release means for pushing the filter away at a certain location.

7. The invention of claim 6 wherein the release means comprises a curved front surface in front of the at least one sharpened tooth.

8. The invention of claim 7 wherein the at least one tooth comprises a plurality of teeth.

9. The invention of claim 8 wherein the plurality of teeth comprise at least two approximately parallel teeth.

\* \* \* \* \*